United States Patent
Al Jurdi et al.

(10) Patent No.: US 12,160,829 B2
(45) Date of Patent: Dec. 3, 2024

(54) SYSTEM AND METHOD FOR SHAPING ULTRA-WIDE BAND RANGING TIMELINE FOR COEXISTENCE WITH WI-FI COMMUNICATION

(71) Applicant: Samsung Electronics Co., Ltd., Suwon-si (KR)

(72) Inventors: Rebal Al Jurdi, Allen, TX (US); Rubayet Shafin, Allen, TX (US); Hao Chen, Plano, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 336 days.

(21) Appl. No.: 17/810,280

(22) Filed: Jun. 30, 2022

(65) Prior Publication Data
US 2023/0017748 A1 Jan. 19, 2023

Related U.S. Application Data

(60) Provisional application No. 63/221,796, filed on Jul. 14, 2021.

(51) Int. Cl.
| | |
|---|---|
| *H04W 4/02* | (2018.01) |
| *H04B 1/7163* | (2011.01) |
| *H04W 52/02* | (2009.01) |
| *H04W 72/10* | (2009.01) |
| *H04W 84/12* | (2009.01) |

(52) U.S. Cl.
CPC ... *H04W 52/0248* (2013.01); *H04W 52/0216* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 9,148,823 B2 * | 9/2015 | Forssell | H04W 28/24 |
| 11,262,445 B2 | 3/2022 | Lee et al. | |
| 11,483,829 B2 * | 10/2022 | Zhou | H04W 74/006 |
| 11,516,822 B2 * | 11/2022 | Chen | H04W 72/1268 |
| 11,533,698 B2 * | 12/2022 | Silverman | H04W 24/08 |
| 11,546,014 B2 * | 1/2023 | Yang | H04W 16/14 |
| 11,564,057 B2 * | 1/2023 | Barton | G01S 5/0236 |
| 11,638,233 B2 * | 4/2023 | Shin | G01S 5/0284 |
| | | | 455/456.1 |
| 11,644,525 B2 * | 5/2023 | Silverman | G01S 5/0249 |
| | | | 455/456.1 |
| 11,662,797 B2 * | 5/2023 | Lingutla | G06F 1/3206 |
| | | | 713/323 |

(Continued)

FOREIGN PATENT DOCUMENTS

| | | |
|---|---|---|
| KR | 1020210117580 A | 9/2021 |

*Primary Examiner* — Tuan A Tran

(57) ABSTRACT

A method includes obtaining a sleep-wake schedule associated with Wi-Fi communication of a Wi-Fi station (STA). The method also includes obtaining UWB-related information associated with ultra-wide band (UWB)-communication of a ranging capable device (RDEV). The method also includes determining a UWB ranging timeline based on a comparison of the sleep-wake schedule and the UWB-related information. The method also includes instructing the RDEV to use the UWB ranging timeline in a UWB ranging event.

20 Claims, 13 Drawing Sheets

(56) References Cited

U.S. PATENT DOCUMENTS

| | | | |
|---|---|---|---|
| 11,695,447 B2* | 7/2023 | Parthasarathi | H04B 7/0602 |
| | | | 375/140 |
| 11,796,667 B2* | 10/2023 | Schoenberg | G01S 13/765 |
| 11,800,410 B1* | 10/2023 | Li | H04W 74/0808 |
| 11,812,334 B2* | 11/2023 | Henry | H04W 74/0825 |
| 11,828,832 B2* | 11/2023 | Henry | H04W 4/80 |
| 11,832,208 B2* | 11/2023 | Henry | H04W 64/00 |
| 11,838,830 B2* | 12/2023 | Barton | H04B 1/7163 |
| 11,849,472 B2* | 12/2023 | Ko | H04W 72/52 |
| 11,965,951 B2* | 4/2024 | Yoon | G01S 11/02 |
| 2017/0123045 A1 | 5/2017 | Shin et al. | |
| 2020/0014526 A1* | 1/2020 | Hammerschmidt | |
| | | | H04L 25/0224 |
| 2021/0072373 A1 | 3/2021 | Schoenberg et al. | |
| 2021/0076396 A1* | 3/2021 | Chen | H04W 72/542 |
| 2021/0173064 A1 | 6/2021 | Yoon et al. | |
| 2021/0399761 A1* | 12/2021 | Parthasarathi | H04B 7/0602 |
| 2021/0400441 A1* | 12/2021 | Burowski | H04W 80/02 |
| 2022/0132531 A1* | 4/2022 | Ko | H04W 24/08 |
| 2022/0171451 A1* | 6/2022 | Lingutla | G06F 1/3209 |

\* cited by examiner

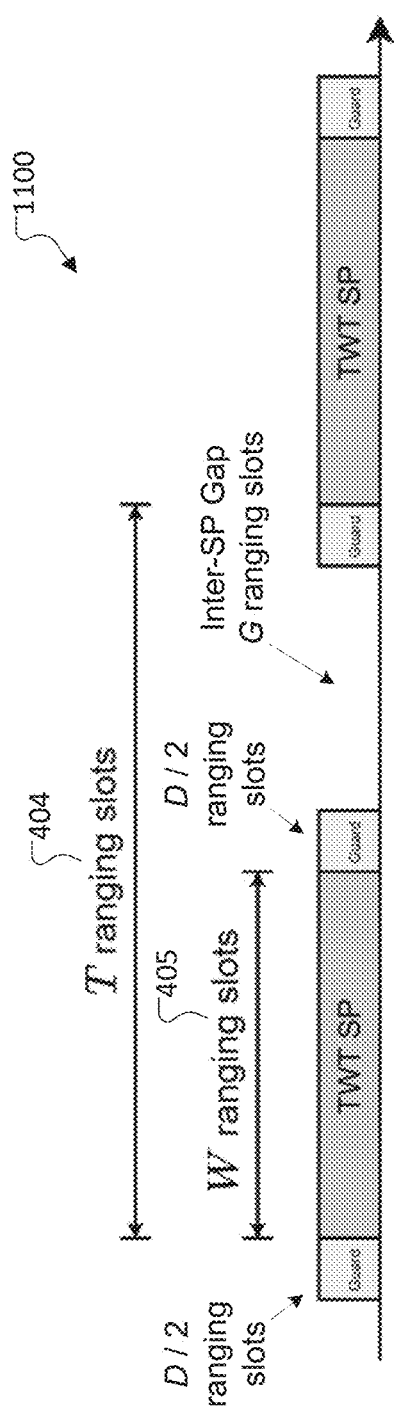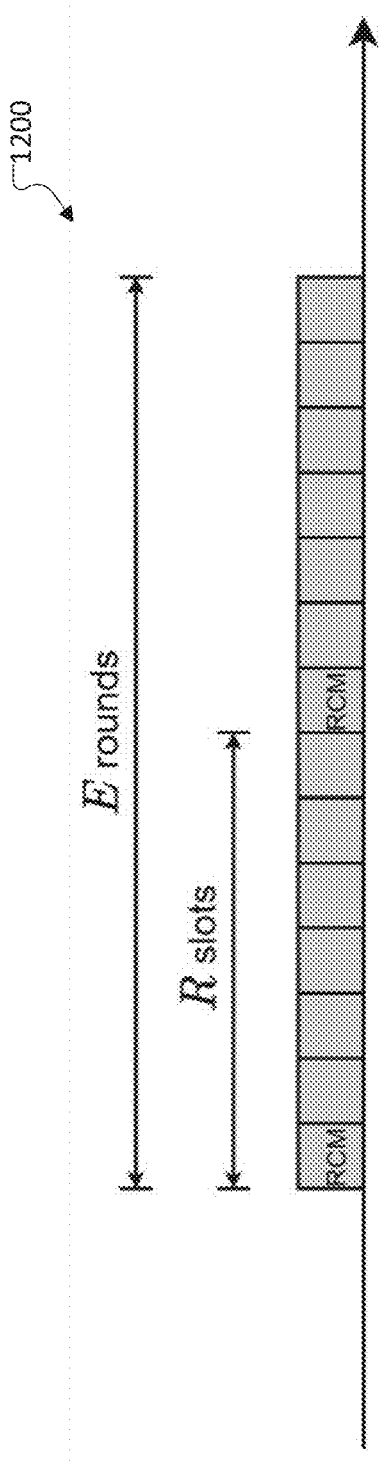
FIG. 11
FIG. 12

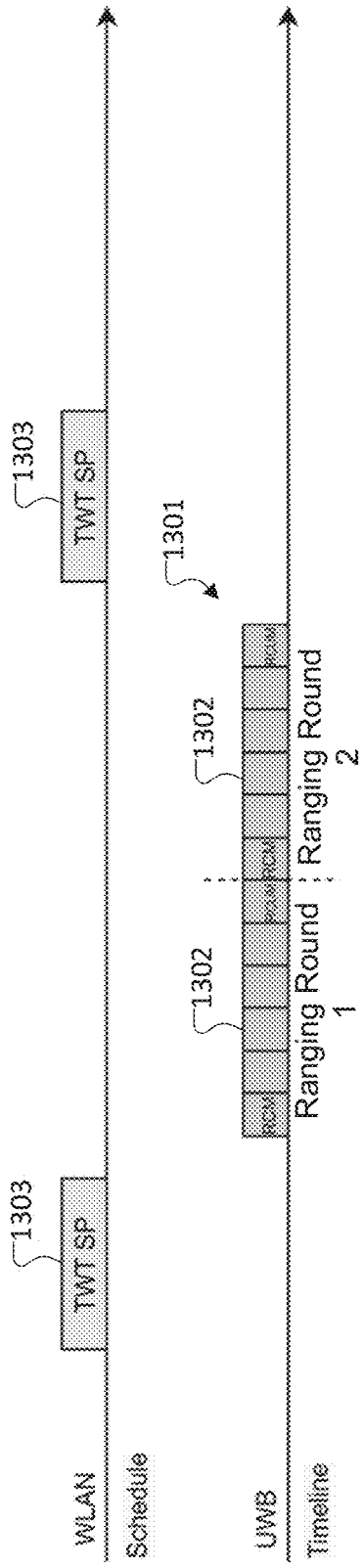
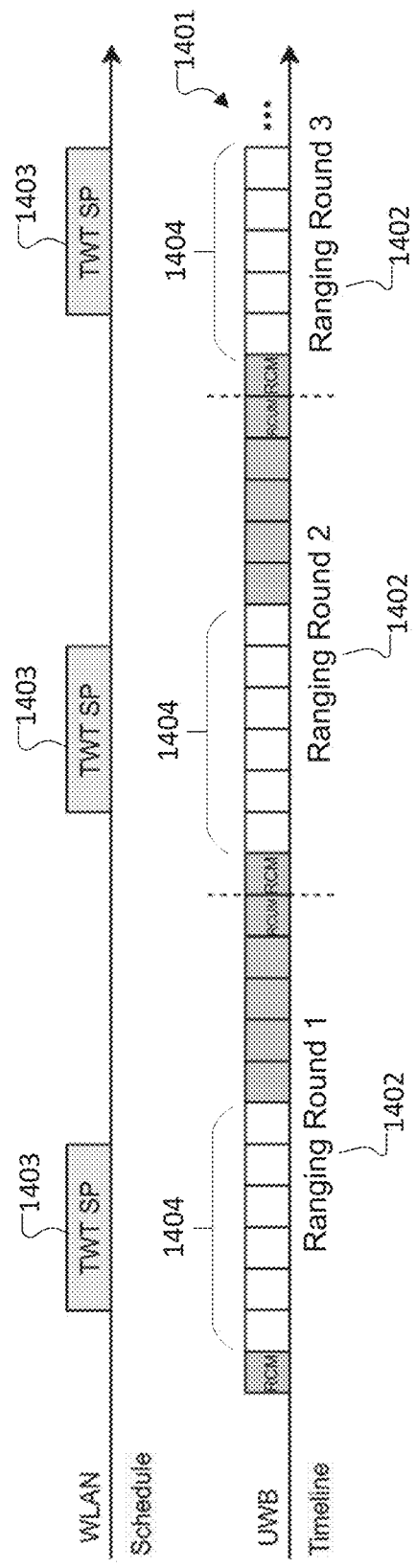
FIG. 13
FIG. 14

SYSTEM AND METHOD FOR SHAPING ULTRA-WIDE BAND RANGING TIMELINE FOR COEXISTENCE WITH WI-FI COMMUNICATION

CROSS-REFERENCE TO RELATED APPLICATIONS AND CLAIM OF PRIORITY

The present application claims priority to U.S. Provisional Patent Application Ser. No. 63/221,796, filed on Jul. 14, 2021. The content of the above-identified patent document is incorporated herein by reference.

TECHNICAL FIELD

The present disclosure relates generally to wireless communication systems and, more specifically, the present disclosure relates to a system and method for shaping an ultra-wide band ranging timeline for coexistence with Wi-Fi communication.

BACKGROUND

Ultra-Wide Band (UWB) is a wireless technology recently added to mobile devices that enables not only data-sharing applications, but also many other use cases such as indoor positioning and navigation. Recently, the Wi-Fi Alliance has started granting Wi-Fi 6 certification to devices implementing the IEEE 802.11ax amendment, which enhances throughput and efficiency in congested environments, and device vendors have been rapidly seeking this certification. The certification program extends to devices capable of operating in the 6 GHz band for bandwidth-intensive applications via the Wi-Fi 6E certification. With some UWB channels spanning the 6 GHz band, which is also used by Wi-Fi-6E-certified devices, the two systems, Wi-Fi and UWB, are at risk of interference from one another.

SUMMARY

The present disclosure relates to wireless communication systems and, more specifically, to a system and method for shaping an ultra-wide band ranging timeline for coexistence with Wi-Fi communication.

In one embodiment, a method includes obtaining a sleep-wake schedule associated with Wi-Fi communication of a Wi-Fi station (STA). The method also includes obtaining UWB-related information associated with ultra-wide band (UWB) communication of a ranging capable device (RDEV). The method also includes determining a UWB ranging timeline based on a comparison of the sleep-wake schedule and the UWB-related information. The method also includes instructing the RDEV to use the UWB ranging timeline in a UWB ranging event.

In another embodiment, a device includes a memory configured to store instructions. The device also includes a processor operably connected to the memory. The processor is configured when executing the instructions to obtain a sleep-wake schedule associated with Wi-Fi communication of STA; obtain UWB-related information associated with UWB communication of a RDEV; determine a UWB ranging timeline based on a comparison of the sleep-wake schedule and the UWB-related information; and instruct the RDEV to use the UWB ranging timeline in a UWB ranging event.

In yet another embodiment, a non-transitory computer readable medium includes a plurality of instructions. The plurality of instructions, when executed by at least one processor, is configured to cause the at least one processor to: obtain a sleep-wake schedule associated with Wi-Fi communication of STA; obtain UWB-related information associated with UWB communication of a RDEV; determine a UWB ranging timeline based on a comparison of the sleep-wake schedule and the UWB-related information; and instruct the RDEV to use the UWB ranging timeline in a UWB ranging event.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 11 illustrates an example TWT session with parameters shown in ranging slots, according to embodiments of this disclosure;

FIG. 12 illustrates an example ranging event used by a ranging app according to embodiments of this disclosure;

FIGS. 13 through 16 illustrate different examples for shaping a UWB ranging timeline according to embodiments of this disclosure.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another or can operate as standalone schemes.

Figure 1:
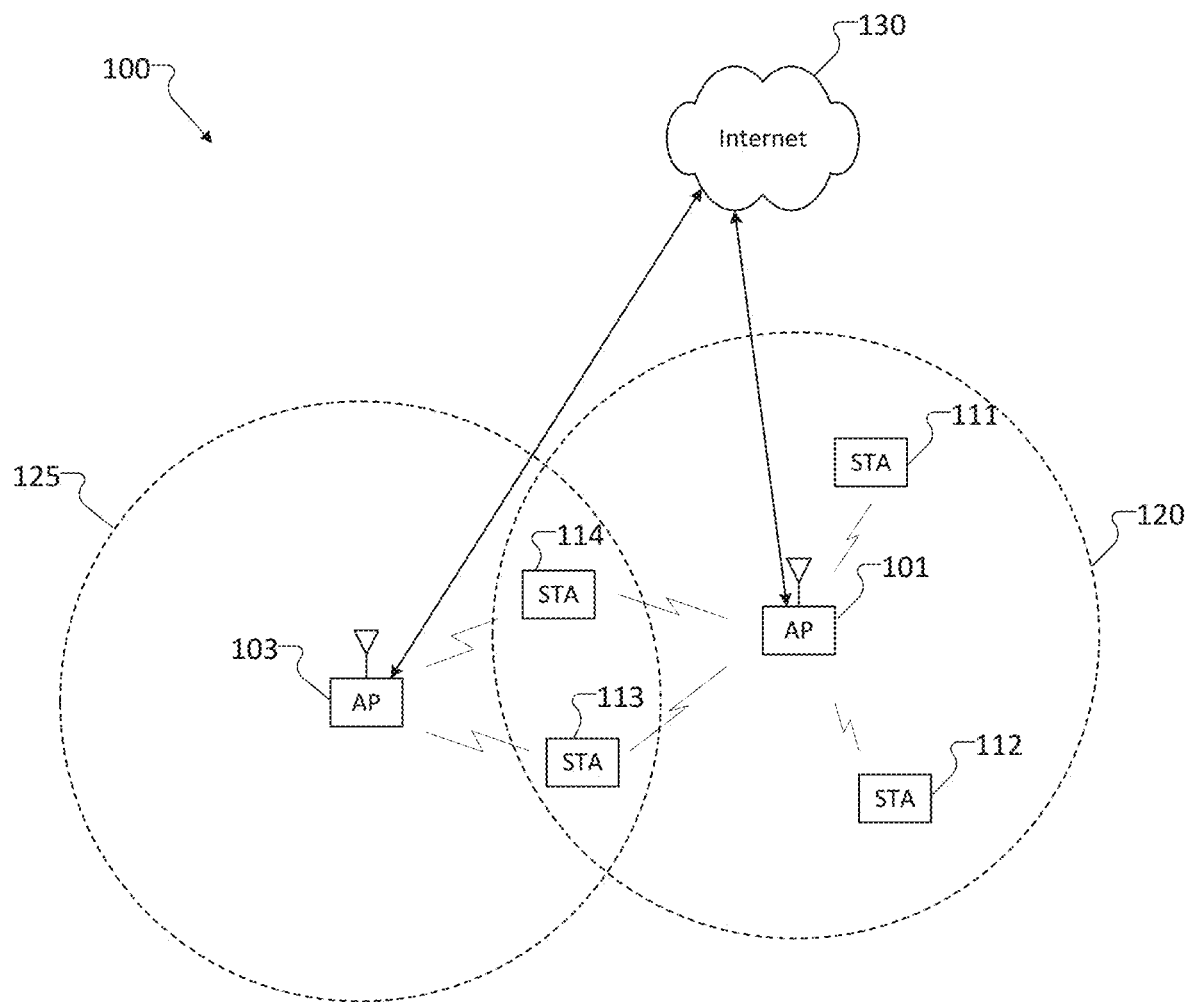
FIG. 1 illustrates an example wireless network according to embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for shaping an ultra-wide band ranging timeline for coexistence with Wi-Fi communication. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
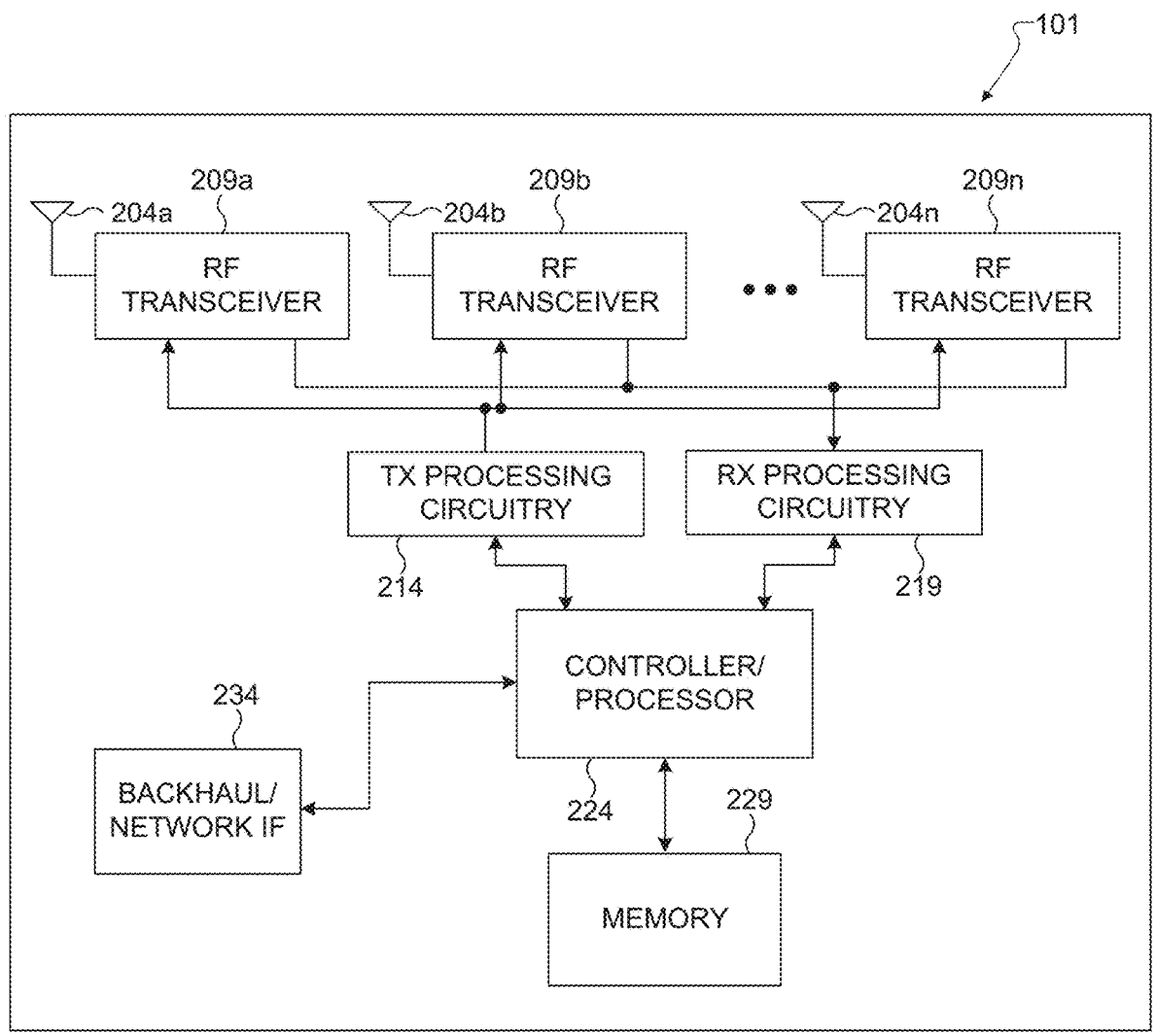
FIG. 2A illustrates an example AP according to embodiments of the present disclosure.

FIG. 2A illustrates an example AP 101 according to embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204a-204n, multiple RF transceivers 209a-209n, transmit (TX) processing circuitry 214, and receive (RX) processing circuitry 219. The AP 101 also includes a controller/processor 224, a memory 229, and a backhaul or network interface 234. The RF transceivers 209a-209n receive, from the antennas 204a-204n, incoming RF signals, such as signals transmitted by STAs in the network 100. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of uplink channel signals and the transmission of downlink channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including shaping an ultra-wide band ranging timeline for coexistence with Wi-Fi communication. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for shaping an ultra-wide band ranging timeline for coexistence with Wi-Fi communication. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
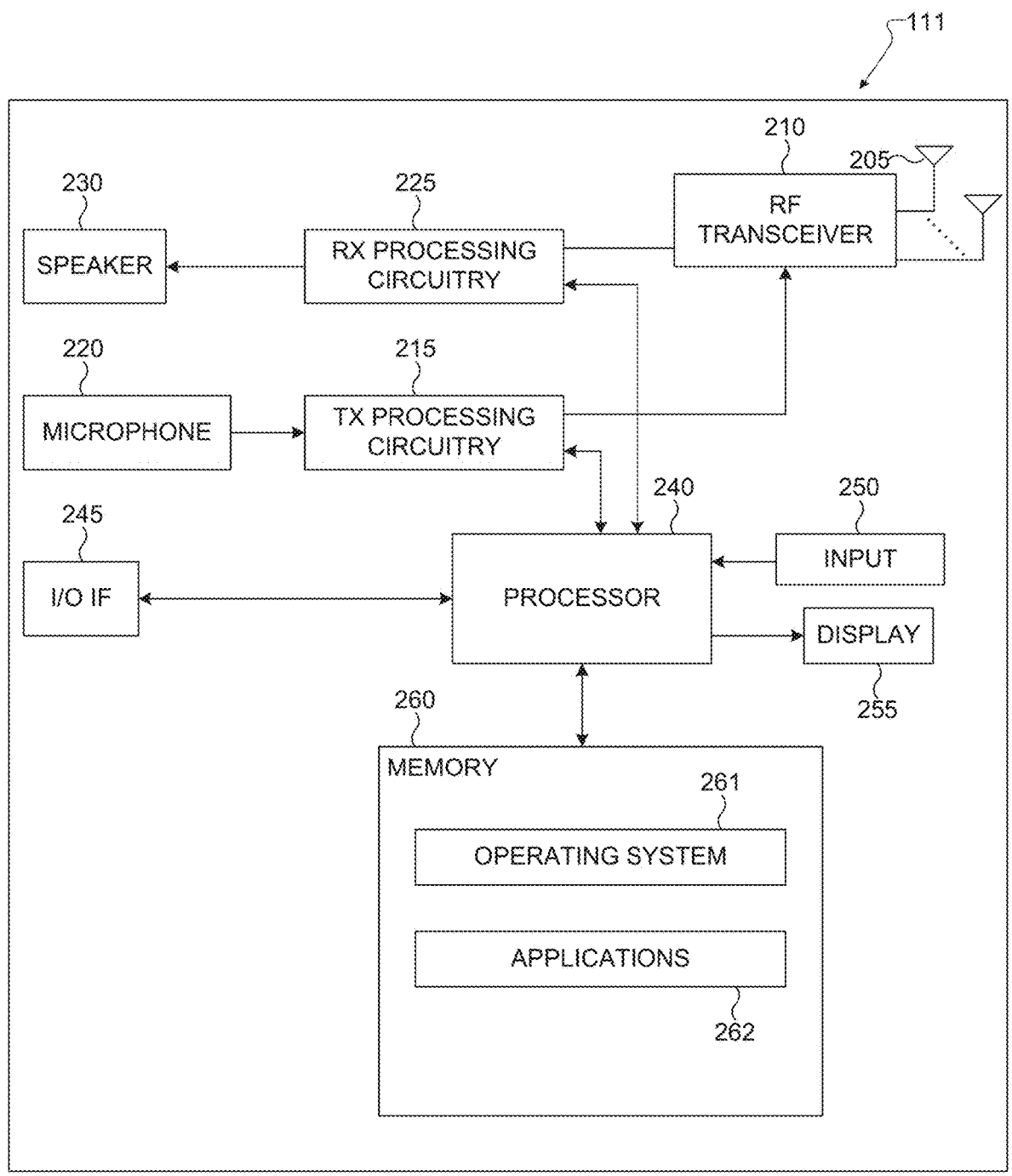
FIG. 2B illustrates an example STA according to embodiments of this disclosure.

FIG. 2B illustrates an example STA 111 according to embodiments of this disclosure. The embodiment of the STA 111 illustrated in FIG. 2B is for illustration only, and the STAs 112-114 of FIG. 1 could have the same or similar configuration. However, STAs come in a wide variety of configurations, and FIG. 2B does not limit the scope of this disclosure to any particular implementation of a STA.

The STA 111 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the main controller/processor 240 controls the reception of downlink channel signals and the transmission of uplink channel signals by the RF transceiver 210, the RX processing circuitry 225, and the TX processing circuitry 215 in accordance with well-known principles. The main controller/processor 240 can also include processing circuitry configured for shaping an ultra-wide band ranging timeline for coexistence with Wi-Fi communication. In some embodiments, the controller/processor 240 includes at least one microprocessor or microcontroller.

The controller/processor 240 can move data into or out of the memory 260 as required by an executing process. In some embodiments, the controller/processor 240 is configured to execute a plurality of applications 262, such as applications for shaping an ultra-wide band ranging timeline for coexistence with Wi-Fi communication. The controller/processor 240 can operate the plurality of applications 262 based on the OS program 261 or in response to a signal received from an AP. The main controller/processor 240 is also coupled to the I/O interface 245, which provides STA 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 111 can use the touchscreen 250 to enter data into the STA 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

Power Management in WLAN

The IEEE 802.11 WLAN standard defines different power management mechanisms to reduce power consumption in WLAN STAs. The very first of those mechanisms, as defined in the original 802.11, allows the STA to inform the AP that is going to sleep or waking up from sleep. The STA can be in one of two power states: Awake, where the STA is turned on and fully powered, and Doze, where the STA is unable to transmit or receive. Further, the STA can operate in 2 power management modes: Active and Power-Save (PS). In Active mode, the STA is always in the Awake state, where the STA may send and receive frames at any time. In PS mode, the STA can transition back and forth between the Doze state where it is sleeping and the Awake state where it may send data, listen to beacon frames (e.g., from the AP) and poll the AP for buffered data. To transition from one power management mode to another, the STA sends a frame to the AP with the transition information to which the AP responds with an ACK.

There are two mechanisms to go to and wake up from sleep. These two mechanisms are referred to herein as Legacy Power Management. In the first mechanism, the STA goes to sleep by transitioning from Active mode to PS mode where it remains in the Doze state by sending a null frame and setting the PWR MGT bit. The AP acknowledges. The STA wakes up from sleep by transitioning from PS mode back to Active mode by sending a null frame and clearing the PWR MGT bit. The AP acknowledges.

In the second mechanism, the STA goes to sleep by transitioning from the Awake state to the Doze state while in PS mode. The STA wakes up from sleep by transitioning from the Doze state to the Awake state. Unlike in Active mode (where the STA receives fresh data from the AP without having to poll the AP), the STA in the Doze state retrieves data by polling the AP for buffered frames one at a time. Specifically, the STA in PS mode may elect one of two methods for the delivery of its frames buffered at the AP. One method is by using PS Polls. In PS polls, the STA listens to a traffic indicator map (TIM) to determine if the AP has buffered frames for the STA. The STA sends a PS Poll to the AP telling the AP that the STA is awake. The AP sends a buffered frame to the STA. If the frame has the "More Data" bit set, indicating that there are more buffered frames for the STA, the STA will send another PS Poll to get another buffered frame. This is repeated until the AP has no more frames for the STA.

Further amendments to the IEEE 802.11 WLAN standard have introduced other power saving mechanisms (e.g., the QoS-reliant Automatic Power Save Delivery (APSD) in 802.11e) to reduce the overhead of frame retrieval in the Legacy method. APSD can be combined efficiently with the above-described legacy power management features to accommodate mixed traffic. The period during which the STA is actively sending or receiving frames is referred to in the 802.11e amendment as the Service Period. To use APSD, a STA submits a Traffic Specification (TSPEC) request with the APSD field set to indicate APSD is to be used (e.g., setting the APSD field to a 1). A TSPEC contains an estimate of the data traffic and associated requirements. All buffered frames associated with an admitted APSD TSPEC are transmitted during a service period.

There are two types of service periods possible under APSD—unscheduled and scheduled—thus leading to two variants of APSD, namely Unscheduled APSD (U-APSD) and Scheduled APSD (S-APSD). The Unscheduled APSD was coined to the more commonly used contention-based medium access control (MAC) technique of 802.11. With U-APSD, the STA enters PS mode where it is able to retrieve all of its buffered frames by polling the AP only once. Unscheduled APSD can be used only with contention-based access, while Scheduled APSD can be used with both contention-based and polled access.

There have been subsequent additions and improvements to power management, e.g. Spatial Multiplexing (SM) Power Save Power Save Multi Poll (PSMP), and BSS Wireless Network Management Max Idle Period and Sleep Mode introduced in the earlier 802.11n and 802.11v amendments, and Target Wake Time (TWT) introduced in the recent 802.11ah amendment.

The remainder of this disclosure will use the terms "asleep" and "sleep" to refer to any state where the WLAN STA cannot actively transmit or receive WLAN frames and use the terms "awake" and "wake-up" to refer to any state where the STA can actively transmit or receive frames.

Scheduled Automatic Power-Save Delivery (S-APSD)

Figure 3:
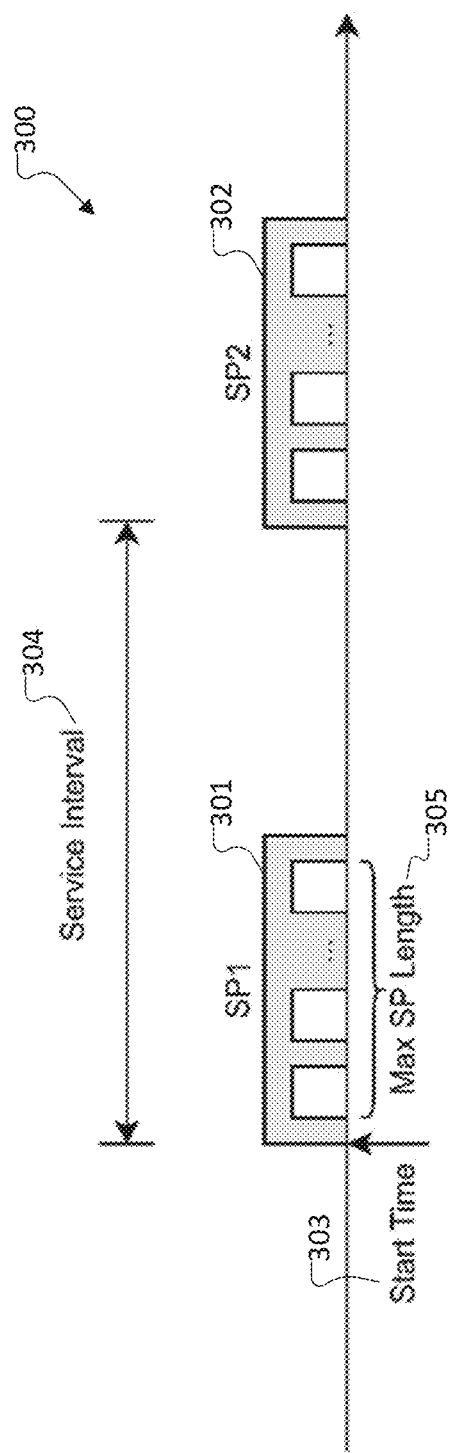
FIG. 3 illustrates an example S-APSD session that includes multiple service periods.

As discussed above, IEEE 802.11e provides MAC enhancements for Quality of Service (QoS). Among those enhancements is S-APSD, a power management mechanism that schedules the delivery of frames buffered at the AP during periods where the STA is awake. These periods are known as Service Periods (SPs). FIG. 3 illustrates an example S-APSD session 300 that includes service periods SP1 301 and SP2 302. In the S-APSD session 300, the STA can propose to the AP a suitable sleep-wake schedule that meets its QoS expectations. The schedule is defined by a set of parameters, as shown in FIG. 3, including:

Service Start Time 303: The start time of the first/earliest SP.

Minimum/Maximum Service Interval (not shown): The minimum and maximum time between 2 successive SPs.

Maximum SP Length 305: The maximum number of buffered frames at the AP that may be delivered to the STA.

The AP can then confirm the request or override it with a different schedule which is similarly defined by a set of parameters including Service Start Time 303 and Service Interval 304, which is the time between two successive SPs. The negotiation of the sleep-wake schedule of the STA with the AP takes place through an exchange of association and re-association requests and responses.

Target Wake Time

Figure 4:
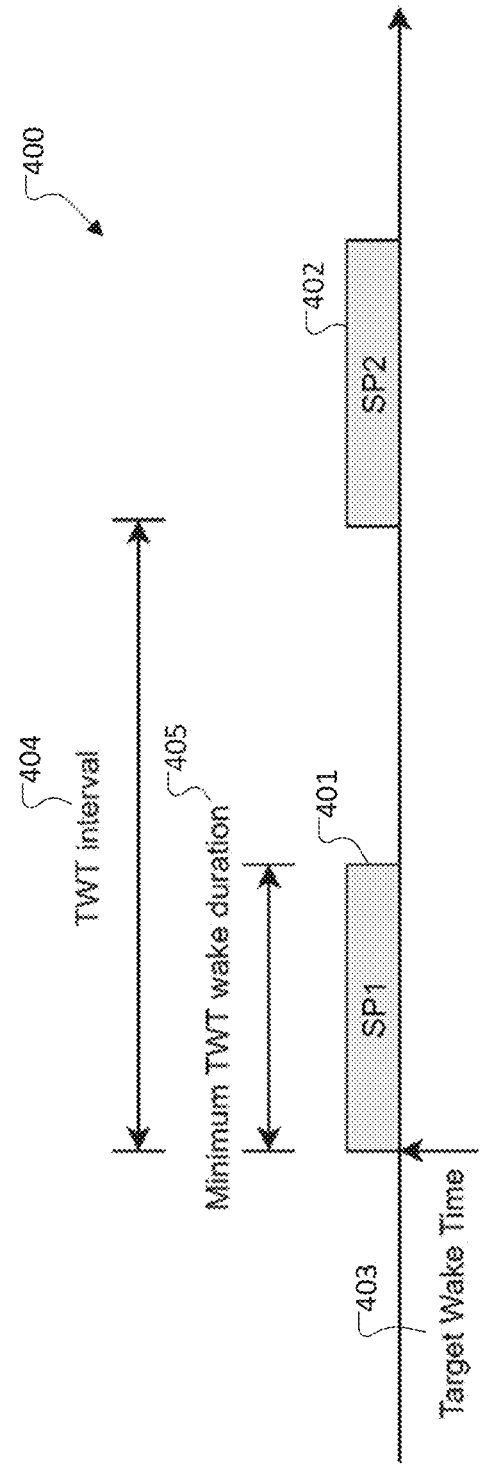
FIG. 4 illustrates an example TWT session that includes multiple session periods.

IEEE 802.11ah defines a mechanism to mitigate channel contention and promote coexistence in dense WLAN scenarios and deterministic behavior. This mechanism is known as Target Wake Time (TWT). Using TWT, every WLAN station (STA) negotiates with the access point (AP) periods in which the STA is awake to transmit and receive packets. These periods are known as the TWT Session or the Session Period (SP). FIG. 4 illustrates an example TWT session 400 that includes session periods SP1 401 and SP2 402. Outside the session periods 401 and 402, the device remains asleep. The wake schedule is defined by a set of parameters, referred to as TWT parameters. As shown in FIG. 4, the parameters include the following:

Target Wake Time 403: The next time the STA should wake up.

TWT Interval 404: The time interval between adjacent session periods.

TWT Minimum Wake Duration 405: The minimum duration the STA stays awake.

The negotiation happens via at least one exchange of request/response messages between the STA and AP as follows. The STA sends a request message to the AP containing its desired set of TWT parameters. The AP sends back a response message approving or rejecting these parameters. If the STA does not get an approval of the desired TWT parameters, the STA can enter subsequent exchanges to renegotiate. Once the negotiation completes, the STA goes to sleep and does not wake up until the Target Wake Time 403, stays awake for the SP with length specified by the TWT Minimum Wake Duration 405, and then goes back to sleep. During the SP, the STA can send and receive data.

Regardless of the power management mechanism being used, the period during which the STA is awake, i.e., actively sending or receiving frames, is referred to in this disclosure as a Service Period (SP).

With power management, an STA can follow a sleep-wake schedule marked by interleaved active periods, where the STA is sending or receiving frames, and idle periods, where the STA is asleep. The presence of swaths of idleness provides a natural environment for the coexistence between WLAN and UWB via time-division-multiplexing (TDM). Given the sleep-wake schedule of the STA, the UWB ranging device (RDEV) assuming the role of a controller can devise a ranging timeline to align its activity with the idleness of WLAN.

UWB Ranging Timeline

UWB is a wireless technology that enables positioning and proximity applications. Specifically, the 802.15.4z amendment to the IEEE Standard for Low-Rate Wireless Networks defines UWB ranging techniques and ranging modes of operation that standardize the computation and communication of key physical quantities, such as round-trip time between two ranging capable devices (RDEVs), time of flight, and two- or three-dimensional angle of arrival.

Figure 5:
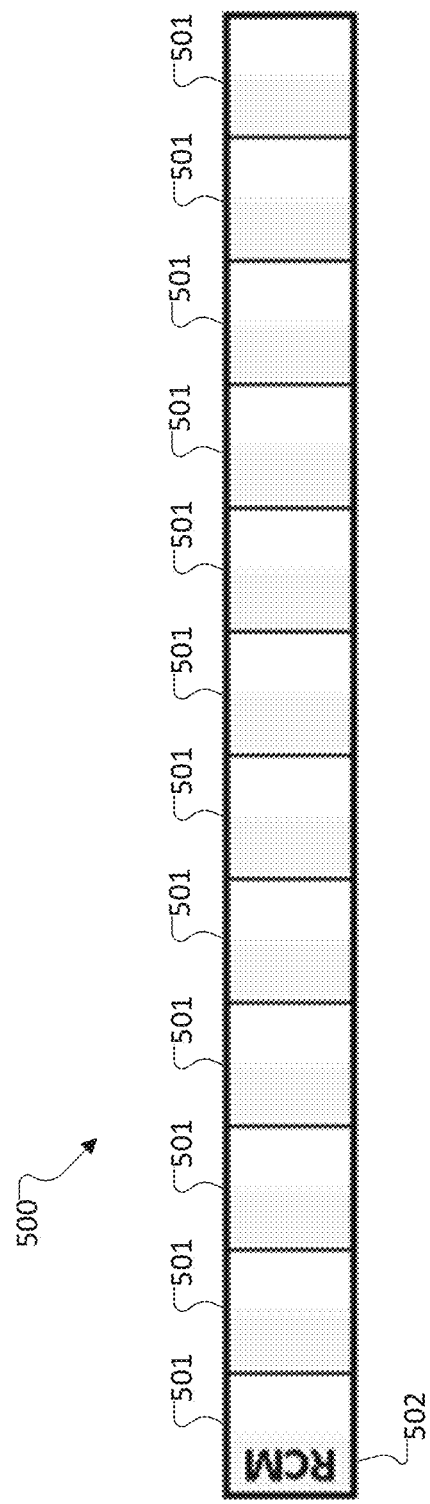
FIGS. 5 and 6 illustrate examples of ranging rounds according to the block-based ranging mode.
Figure 6:
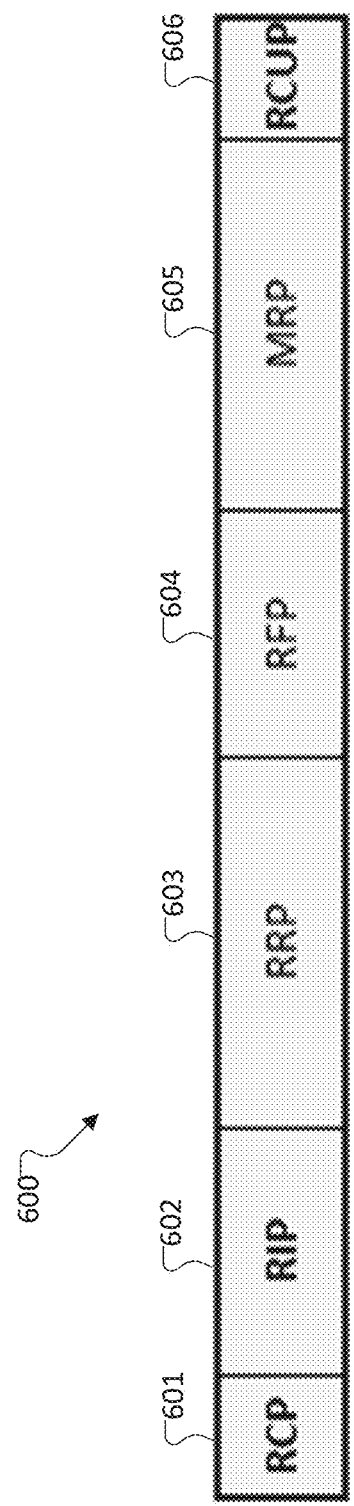
Figure 7:
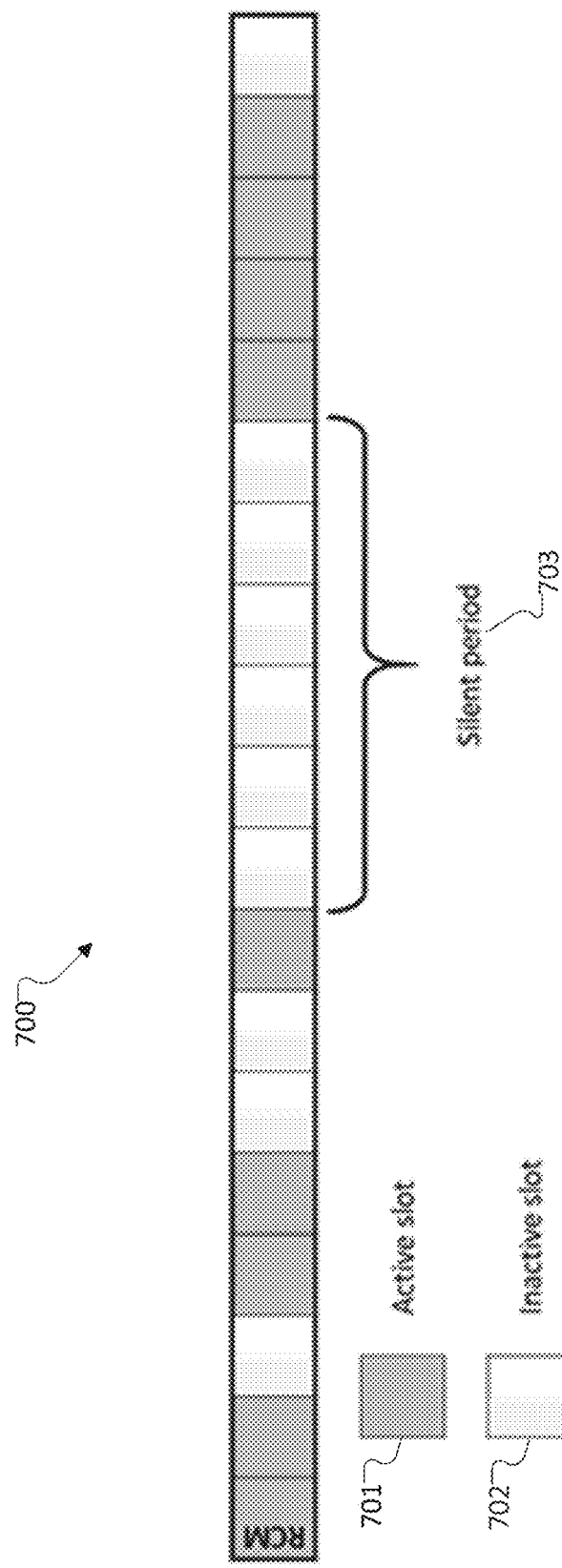
FIG. 7 illustrates an example ranging round that includes active slots, inactive slots, and a silent period.

FIGS. 5 through 7 illustrate examples of ranging rounds according to one ranging mode, the block-based mode. The ranging event according to the block-based mode defined in 802.15.14z has the following breakdown: ranging blocks contain multiple ranging rounds (back-to-back), where each ranging round further contains multiple ranging slots. For example, FIG. 5 shows a ranging round 500 that includes twelve ranging slots 501. The duration of a ranging slot 501 can be, e.g., 0.5 ms, 1 ms, 2 ms, 5 ms, or the like. Each ranging round 500 starts with a Ranging Control Message (RCM) 502, which contains control information for the current and possible subsequent ranging rounds. As shown in FIG. 6, a ranging round 600 is split into the following phases, in chronological order: Ranging Control Phase (RCP) 601, Ranging Initiation Phase (RIP) 602, Ranging Response Phase (RRP) 603, optional Ranging Final Phase (RFP) 604, optional Measurement Report Phase (MRP) 605, and optional Ranging Control Update Phase (RCUP) 606.

In the RCP 601, the controller sends the RCM 502 to the participant devices. In the RIP 602, the initiator sends out initiation ranging. In the RRP 603, responders each perform ranging in response to initiation. In the (optional) RFP 604, the initiator follows up with a second and final ranging. In the (optional) MRP 605, responders communicate measurements (e.g., ToF, AoA, and the like) to the initiator. In the RCUP 606, the controller sends a Ranging Control Update Message (RCUM), which is to update the round structure for the next rounds. The control information that is sent in the RCM 502 and RCUM is enclosed inside Information Elements (IEs) and embedded in the MAC payload.

An active slot is defined as a ranging slot where a device is expected to be active, i.e., actively transmitting or receiving. The following types of ranging slots are considered active slots:

Slots where the RCM and RCUM are transmitted by the controller.

Slots where an initiator performs ranging.

Slots where an initiator performs follow-up ranging.

Slots where the RDEV performs ranging, regardless of whether the RDEV is an initiator or a responder.

Slots where the RDEV sends measurement reports.

Slots containing transmission from any participant, be it ranging or data communication, that the RDEV has an interest in listening to.

The following IEs, among others, determine the location of active slots over the horizon of at least the ranging round in which they are first defined, and potentially for subsequent ranging rounds and ranging blocks as well:

Advanced Ranging Control IE (ARC IE): Carried by the RCM. The ARC IE provides the duration of ranging slots, the number of ranging slots in a ranging round, and the number of ranging rounds in a ranging block. The ARC IE also specifies whether there is an MRP. The ARC IE also determines the number of rounds that control information provided by the RCM is valid for.

Ranging Contention Phase Structure IE (RCPS IE): Carried by the RCM when the ARC IE indicates that contention-based ranging is used. The RCPS IE specifies the start/stop ranging slot delimiters of the RIP, RRP, and MRP.

Ranging Device Management IE (RDM IE): Carried by the RCM. The RDM IE assigns to every participating device a ranging role (e.g., initiator or responder), and allots ranging slots to range or report measurements.

Ranging Round IE (RR IE): Carried by the RCM or the RCUM. The RR IE indicates whether the MAC frame should be transmitted at an offset from the edge of the ranging slot. The RR IE also tracks the index of ranging blocks and rounds.

Ranging Block Update IE (RBU IE): Carried by the RCM or the RCUM to signal whether a new ranging configuration is being used, i.e., to update the sizes of the ranging block, round and slot. The RBU IE also signals the number of remaining blocks with the existing structure before switching to a new structure.

In addition to the in-band control information sent to the participants by the controller through the RCM and RCUM, out-of-band (OOB) information exchanged by the controller and controlee applications is typically important in determining active slots in any given ranging round. The OOB information can delineate the ranging timeline. In some embodiments, the OOB information can include setup parameters (e.g., number of participants, ranging roles, and the like) that are negotiated between the ranging participants at the app level and communicated, for example, via BLUETOOTH or WiFi. The setup parameters can include any of the parameters carried inside the RCM. Such parameters can be negotiated OOB, and then carried inside the RCM. Alternatively, the parameters can be negotiated OOB, but not carried inside the RCM. Specific examples of OOB information can include device type, device role, multi-node mode, number of controlees, source MAC address, destination MAC address, MAC address mode, ranging method, ranging interval, slots per RR, slot duration, ranging time structure, scheduled mode, UWB initiation time, ranging round hopping, maximum contention phase length, contention phase update length, session priority, maximum number of RR retries, MAC configuration, MAC type, responder slot index, in-band termination attempt count, STS configuration, number of STS segments, vendor ID, static STS IV, STS index, key rotation, key rotation rate, AoA result request, ranging data NTF (near), ranging data NTF (far), blink random interval, authenticity tag, and the like.

FIG. 7 illustrates an example ranging round 700 that includes active slots 701 (which are ranging slots where the device is expecting to range, measure, report, or eavesdrop), inactive slots 702, and a silent period 703, which is a group of contiguous inactive slots 702.

A ranging app, or application, has a ranging timeline, as part of a ranging configuration, which is commensurate with the use case. For example, an app that serves as a key to access a vehicle or residence has different requirements (e.g. in terms of the ranging method, structure, and measurements) than an app that performs continuous indoor localization. The latter can demand a ranging event that persists as long as the app is running in the foreground of the device. The former, however, can make do with only a few ranging blocks, or even a single ranging block with a few ranging rounds, each lasting for a few milliseconds.

The ranging configuration, which characterizes the duration of the ranging event at a high level and its structure at a low level, can influence how the STA (WLAN) and RDEV (UWB) share the medium.

Wi-Fi 6E and UWB Channels 5-7 occupy parts of the 6-GHz band. While Wi-Fi and WLAN are used for data applications, UWB (IEEE 802.15.4z) is used for ranging applications, and these two application classes can be operating simultaneously on a device. Significant levels of interference can be seen at the physical layers of WLAN and UWB when both systems are operating simultaneously. Favorable coexistence of these two systems on the same device (i.e., in-device coexistence) is desired to ensure good performance on both fronts: acceptable throughput, latency, among other network-related indicators for WLAN, and acceptable ranging latency for UWB.

To address these and other issues, this disclosure provides a system and method for shaping a UWB ranging timeline for coexistence between Wi-Fi and UWB communication in the time domain. In the disclosed embodiments, the STA first subscribes to a sleep-wake schedule, and then the RDEV schedules its ranging event accordingly. As described in more detail below, the disclosed embodiments include a coordinator that obtains Wi-Fi-related information that is indicative of a STA's wake-and-sleep schedule for Wi-Fi communication. The coordinator also obtains UWB-related information based on information in the UWB application layer. Then, the coordinator schedules the RDEV's ranging event based on the STA's wake-and-sleep schedule and the UWB-related information, writing the appropriate IEs inside the RCM with the appropriate values.

Note that while some of the embodiments discussed below are described in the context of use in consumer electronic devices, such as smartphones or tablet computers, these are merely examples. It will be understood that the principles of this disclosure may be implemented in any number of other suitable devices or contexts.

Figure 8:
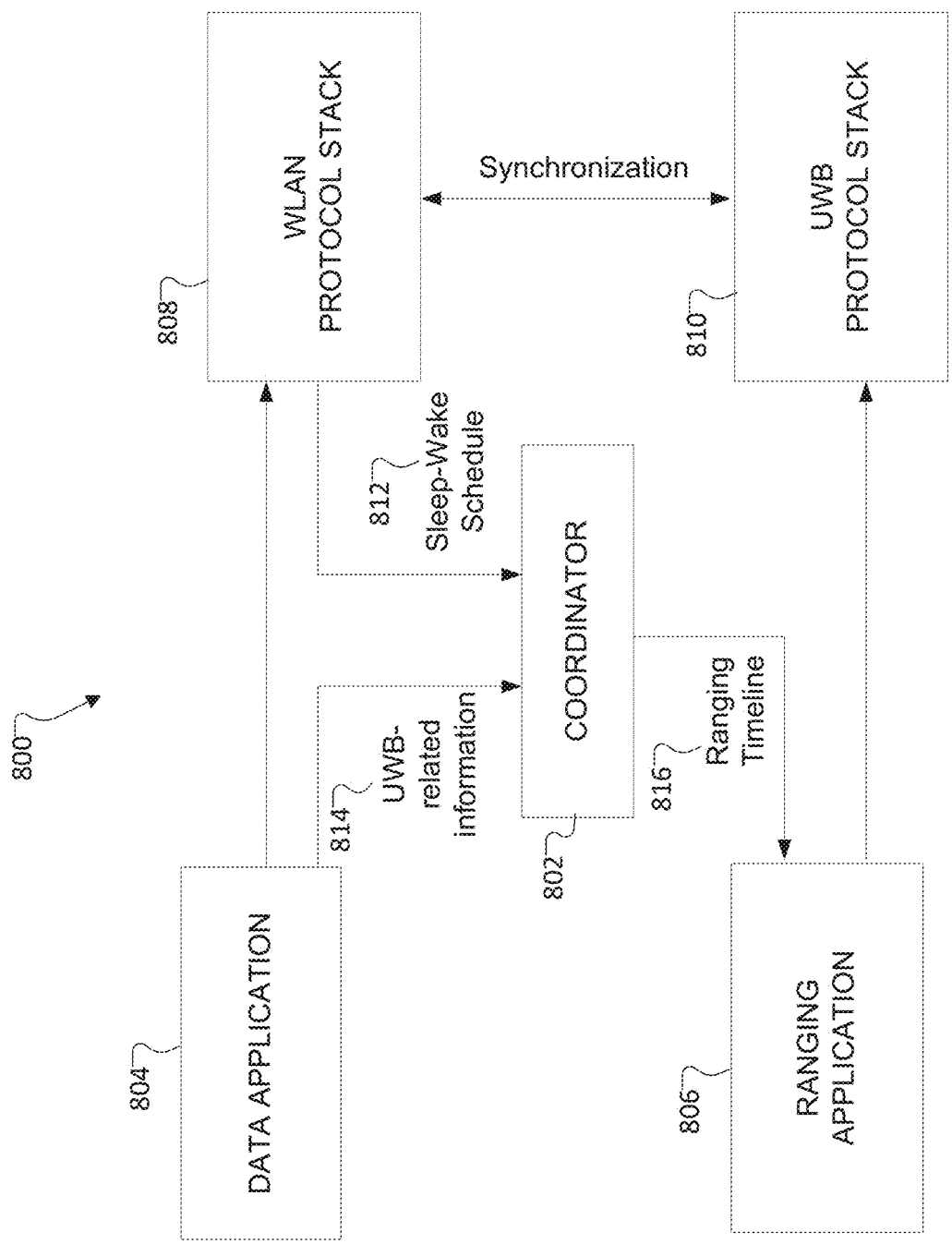
FIG. 8 illustrates an example framework for shaping a UWB ranging timeline for coexistence with Wi-Fi communication according to embodiments of the present disclosure.

FIG. 8 illustrates an example framework 800 for shaping a UWB ranging timeline for coexistence with Wi-Fi communication according to embodiments of the present disclosure. The embodiment of the framework 800 shown in FIG. 8 is for illustration only. Other embodiments of the framework 800 could be used without departing from the scope of this disclosure. For ease of explanation, the framework 800 will be described as being implemented in the STA 111 of FIG. 1. However, the framework 800 could be implemented in any other suitable device.

As shown in FIG. 8, the framework 800 includes a coordinator 802, a data application 804, and a ranging application 806. The STA 111 can execute both applications 804, 806 simultaneously without affecting performance. The data application 804 uses the WLAN protocol stack 808 of the STA 111, and the ranging application 806 uses the UWB protocol stack 810 of the STA 111. In some embodiments, the data application 804 can include, e.g., a video/voice call, audio streaming, file upload/download, or any real-time or non-real-time data application. The ranging application 806 can be a proximity or positioning application that shows the user navigating indoors (e.g., at a shopping mall, airport, or the like). Of course, these are merely examples, and the data application 804 and the ranging application 806 can represent any suitable applications executing on the STA 111.

The coordinator 802 manages the in-device coexistence of the UWB RDEV assuming the role of a controller and WLAN STA by coordinating their activity. The coordinator 802 resides with the RDEV and the STA on the same device. In some embodiments, the coordinator 802 could be implemented in the STA 111 as hardware, software, firmware, or any combination of these. In general, UWB can coexist with WLAN on the same device by going active (i) in another channel (that does not overlap in frequency), (ii) between consecutive SPs, (iii) across consecutive SPs, or a combination of these.

Figure 9:
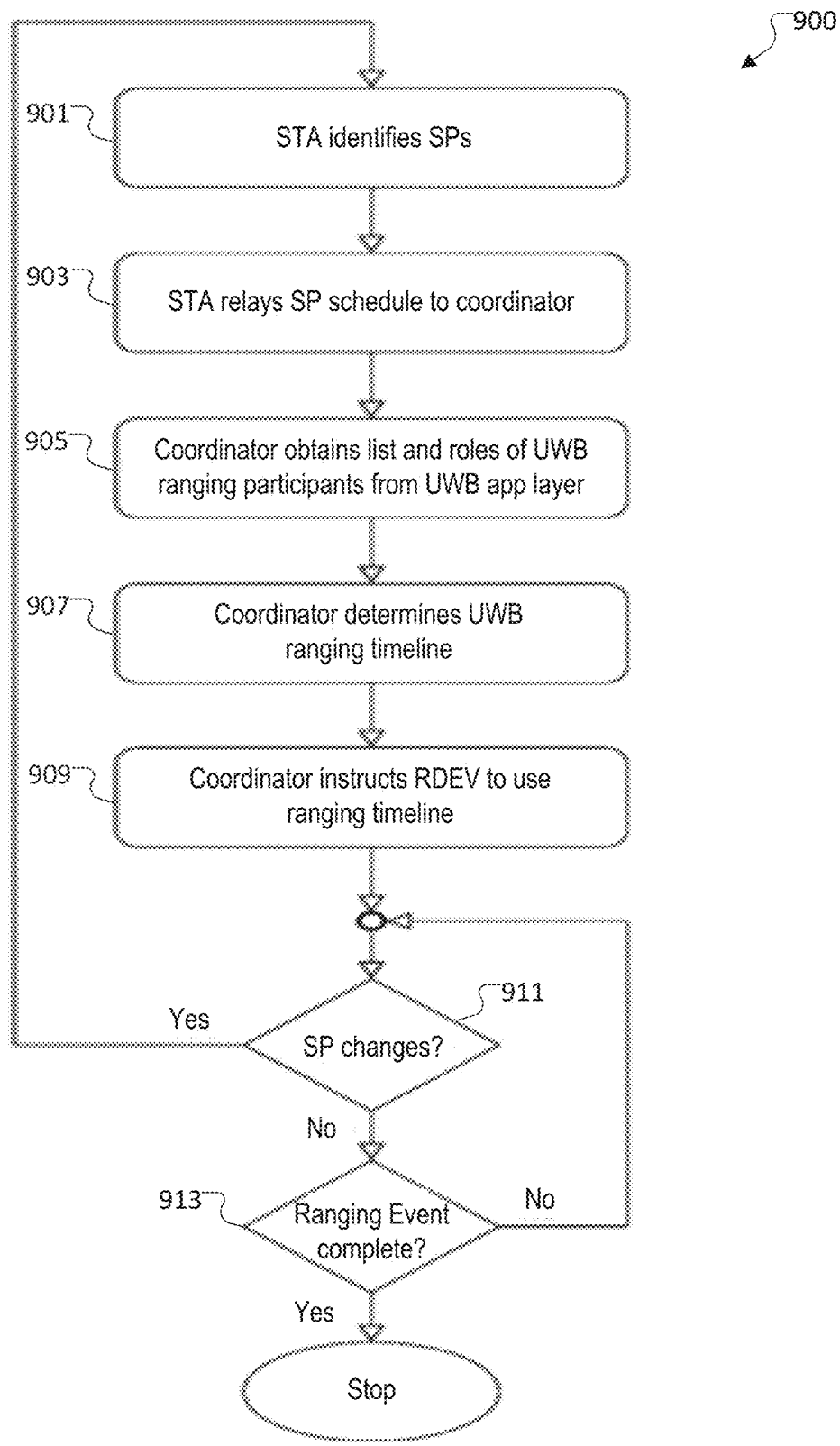
FIGS. 9 and 10 illustrate details of example processes for shaping a UWB ranging timeline for coexistence with Wi-Fi communication according to embodiments of the present disclosure.

As described in greater detail below, the coordinator 802 coordinates activity between the data application 804 (WLAN) and the ranging application 806 (UWB) between or across SPs. To accomplish this, the coordinator 802 obtains Wi-Fi-related information from the WLAN protocol stack 808, where the Wi-Fi related information is indicative of a device's sleep-wake schedule 812 for Wi-Fi communication. The coordinator 802 also obtains UWB-related information 814 from the data application 804 based on information in the UWB application layer. The UWB-relevant information 814 can include, e.g., a list of participants in a UWB ranging event and their respective roles, ranging and localization method used, and requested measurements. The coordinator 802 then uses the obtained information to determine a UWB ranging timeline 816 of a UWB ranging event based a comparison of the sleep-wake schedule 812 and the UWB-related information 814. FIG. 9 illustrates an example of this process.

FIG. 9 illustrates details of an example process 900 for shaping a UWB ranging timeline for coexistence with Wi-Fi communication according to embodiments of the present disclosure. For ease of explanation, the process 900 will be described as being performed by the coordinator 802 (as implemented within the STA 111) using the framework 800. The embodiment of the process 900 shown in FIG. 9 is for illustration only. Other embodiments of the process 900 could be used without departing from the scope of this disclosure.

As shown in FIG. 9, at operation 901, the STA identifies the SPs of the sleep-wake schedule 812 of the STA. In some embodiments, this can include the coordinator 802 requesting through an API that the STA use power management to follow the sleep-wake schedule 812. According to such a schedule, the STA wakes up at specific time instances, remains awake for a set period of time and then goes back to sleep. In some embodiments, the STA informs the AP of its transition between the sleep and awake states by sending a data frame with the appropriate power management information. Furthermore, the STA can negotiate the sleep-wake schedule 812 with the AP (e.g., through TWT or S-APSD), and the AP can know about the SPs before they occur.

At operation 903, the coordinator 802 obtains (e.g., via management frames containing schedule information) the sleep-wake schedule 812, determines the locations of SPs, and deduces the locations of idle periods. The sleep-wake schedule 812 is defined by the power saving mechanism used and the values of the underlying parameters exchanged between the STA and AP via management frames at the level of the Medium Access Control (MAC) layer. If TWT is used, for example, then the sleep-wake schedule 812 is defined by the TWT parameters—the Target Wake Time 403, the TWT Interval 404, and the Minimum TWT Wake Duration 405.

At operation 905, the coordinator 802 obtains at the app level the UWB-related information 814, which can include the list of participants involved in the ranging event, as well as their roles (initiator/responder), ranging and localization method used (e.g., single-sided two-way ranging), and requested measurements (e.g., angle of arrival azimuth). Bluetooth Low Energy (BLE) is one example technology used to communicate ranging information between ranging apps running on different devices prior to the ranging event. The coordinator 802 calculates the required number of ranging slots in a ranging round as follows:

One slot at the start of every ranging round reserved for the RCM.

One optional slot at the end of every ranging round reserved for the RCUM.

One slot per initiator to send out a ranging initiation message. If there is one initiator, and if the initiator assumes the role of the controller, then only one ranging slot can be used for sending out the RCM and sending out the ranging initiation message.

One slot per responder to send out a ranging response message to respond to the ranging initiation message.

One optional slot per responder to send a measurement report message to the initiator.

One slot per initiator to send out a ranging final message. This is only valid when double-sided two-way ranging (DS-TWR) is used.

One optional slot per initiator to send out a measurement report message.

The coordinator 802 infers relevant application-related constraints, e.g., on ranging delay or other. The coordinator 802 can identify the ranging app that is running on the device and look up a combination of ranging parameters in a pre-defined set that are needed to meet performance targets specific to the identified ranging app.

At operation 907, the coordinator 802, based on the preceding information, shapes the UWB ranging timeline 816 around or across the sleep-wake schedule 812. For example, the ranging event can be set to happen between two consecutive SPs or across multiple consecutive SPs. The UWB ranging timeline 816 describes the time slot structure of every ranging round which assigns every ranging slot to a participant (initiator and responder, if any), and purpose (control, ranging, or report messaging). The coordinator 802 then encodes the UWB ranging timeline 816 into IEs to be sent out by the RDEV in the RCM, mainly into the ARC IE and the RDM IE. At operation 909, the coordinator 802 passes these IEs to the RDEV and requests that they be used, thereby instructing the RDEV to use the UWB ranging timeline 816.

At operation 911, the coordinator 802 determines if there are any changes to the SPs of the sleep-wake schedule 812. If there are changes, then the process 900 returns to operation 901, so that the STA can identify the changed SPs of the sleep-wake schedule 812. Otherwise, if there are no changes, then the process 900 continues to operation 913.

At operation 913, the coordinator 802 determines if the ranging event is complete. If the ranging event is not complete, then the coordinator 802 moves to the next ranging round and repeats the sequence of action until the ranging event completes.

Although FIG. 9 illustrates one example of a process 900 for shaping a UWB ranging timeline for coexistence with Wi-Fi communication, various changes may be made to FIG. 9. For example, while shown as a series of steps, various steps in FIG. 9 could overlap, occur in parallel, occur in a different order, or occur any number of times.

Figure 10:
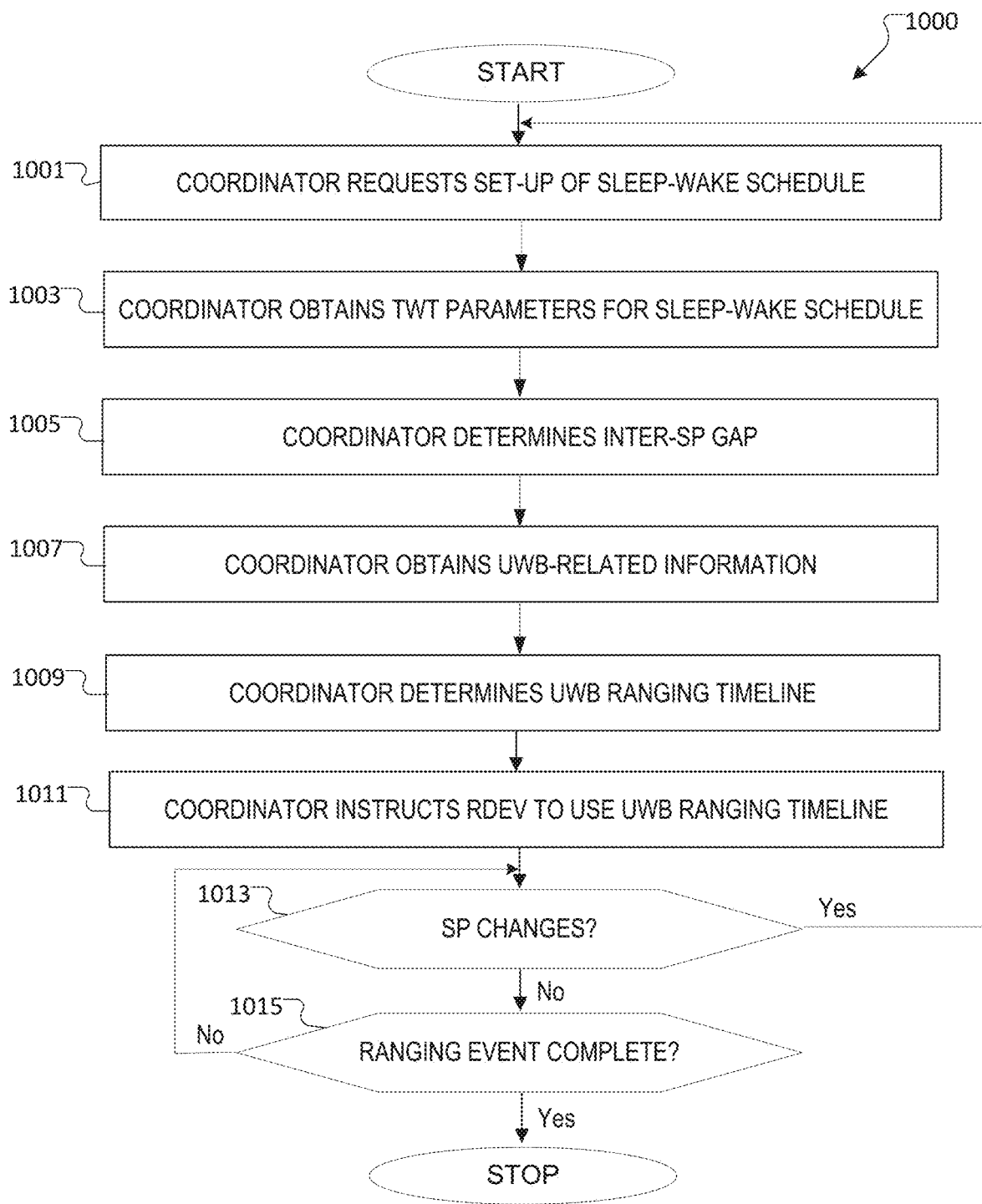

FIG. 10 illustrates details of another example process 1000 for shaping a UWB ranging timeline for coexistence with Wi-Fi communication according to embodiments of the present disclosure. In some embodiments, the process 1000 includes multiple operations that are the same as (or similar to) corresponding operations of the process 900 of FIG. 9. For ease of explanation, the process 1000 will be described as being performed by the coordinator 802 using the framework 800. The embodiment of the process 1000 shown in FIG. 10 is for illustration only. Other embodiments of the process 1000 could be used without departing from the scope of this disclosure.

As shown in FIG. 10, at operation 1001, the coordinator 802 requests that the STA use TWT to set a sleep-wake schedule 812. In some embodiments, the AP advertises one or more schedules, and the STA subscribes to one that is readily available. In other embodiments, the STA negotiates the sleep-wake schedule 812 with the AP by requesting the appropriate TWT parameters—the Target Wake Time 403, the TWT Interval 404, and the Minimum TWT Wake Duration 405. The AP can then accept the parameters as is or modify them. With TWT, the STA wakes up at the start of the SP, sends and receives frames, and then goes back to sleep at the end of the SP.

At operation 1003, the coordinator 802 obtains the TWT parameters that delineate the sleep-wake schedule 812 of the STA, determines the locations of SPs, and deduces the locations of idle periods and their duration. The sleep-wake schedule 812 is defined by the power saving mechanism used and the values of the underlying parameters exchanged between the STA and AP via management frames at the level of the MAC layer. If TWT is used, for example, then the sleep-wake schedule 812 is defined by the TWT parameters.

At operation 1005, the coordinator 802 computes the inter-SP gap, denoted by G, i.e., the period of WLAN idleness that takes place between two consecutive SPs, as follows:

$$G=T-W-D,$$

where the variables T, W, and D respectively denote the TWT Interval 404, the Minimum TWT Wake Duration 405, and potential guard periods before and after the ranging event. The variables in the equation above are denominated in ranging slots, denoted by S.

FIG. 11 illustrates an example TWT session 1100 with parameters shown in ranging slots, according to embodiments of this disclosure. As shown in FIG. 11, the TWT session 1100 includes a TWT Interval 404 having a duration of T ranging slots and a Minimum TWT Wake Duration 405 having a duration of W ranging slots. Thus, the TWT SPs occur periodically with an interval equal to T ranging slots. The guard periods before and after each TWT SP have a combined duration of D ranging slots.

At operation 1007, the coordinator 802 obtains the UWB-related information 814, which can include the list of participants involved in the ranging event as well as their roles (initiator/responder), ranging and localization method used (e.g., single-sided two-way ranging), and requested measurements (e.g., angle of arrival azimuth). The coordinator 802 also identifies a list of ranging configurations supported by the ranging app. For every configuration, the coordinator 802 determines the ranging timeline, including the number of ranging rounds in the ranging event, denoted by E, and number of ranging slots per ranging round, denoted by R. For example, FIG. 12 illustrates an example ranging event 1200 used by a ranging app according to embodiments of this disclosure. As shown in FIG. 12, the ranging event 1200 consists of E ranging rounds, where each ranging round includes R slots. In FIG. 12, E=2 and R=7. Of course, there are merely examples, and other values are possible.

At operation 1009, the coordinator 802 combines the preceding information with relevant application-related constraints (e.g., on ranging delay or the like) to shape the UWB ranging timeline 816 of the RDEV around or across the sleep-wake schedule 812 of the STA. For a given sleep-wake schedule 812, the coordinator 802 can shape the UWB ranging timeline 816 in different ways, such as described in the following examples.

In a first example, if the TWT interval is longer than the ranging event, permitting that G>E·R (i.e., the TWT wake duration is sufficiently longer than the ranging event), the coordinator 802 requests that the RDEV/controller schedule the ranging event between two consecutive SPs. FIG. 13 illustrates an example of this, where a ranging event 1301 comprising two ranging rounds 1302 is scheduled between two consecutive TWT SPs 1303.

In a second example, if the TWT SPs are periodic, and if the TWT interval is of the same order as that of the ranging round, the RDEV/controller can "null-stuff" the ranging rounds by inserting empty slots in one or more middle portions of the ranging event. Here, empty slots are ranging slots that are not designated for ranging or reporting of measurement. FIG. 14 illustrates an example of this, where a ranging event 1401 includes multiple ranging rounds 1402 that are aligned with periodic TWT SPs 1403. Each ranging round includes multiple empty slots 1404.

According to this example, the coordinator 802 computes the number of required empty slots X initially as W+D. The coordinator 802 also, with knowledge of the number of participants, their roles, and the ranging method used, determines the number of active slots A designated for control, ranging, and report frames. If T≤X+A, the coordinator 802 updates the number of slots X to be T−A. Otherwise, if T<X+A, the coordinator 802 attempts to reduce A to T−X by assigning different ranging participants to different ranging rounds.

Figure 15:
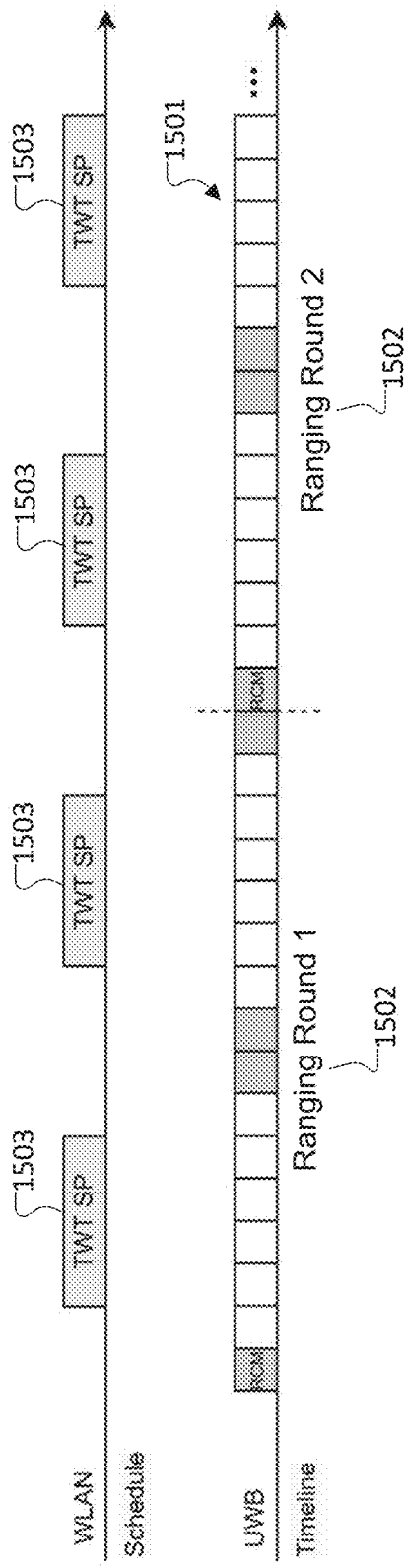

In a third example, if the inter-SP gap is short, the UWB ranging timeline 816 can be chosen such that one ranging round encompasses multiple SPs. FIG. 15 illustrates an example of this, where a ranging event 1501 includes multiple ranging rounds 1502. Each ranging round 1502 extends across multiple TWT SPs 1503.

Figure 16:
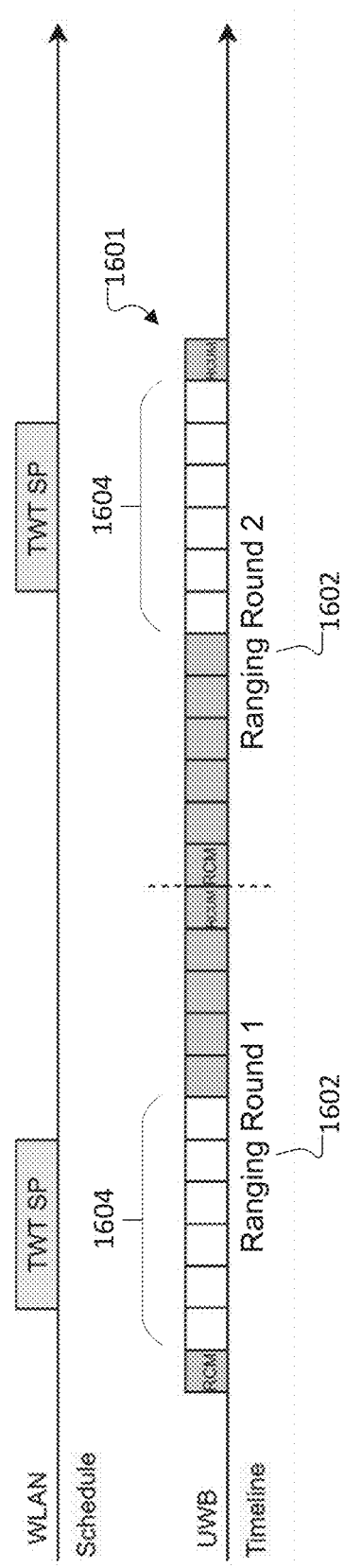

In a fourth example, if the TWT SPs are aperiodic, yet their duration is of the same order as that of the ranging round, the RDEV/controller can null-stuff successive ranging rounds with a varying number of empty slots so that the SPs continue to avoid UWB activity. FIG. 16 illustrates an example of this, where a ranging event 1601 includes multiple ranging rounds 1602. The ranging rounds 1602 have differing arrangements of empty slots 1604.

Once the UWB ranging timeline 816 is determined, the coordinator 802 then encodes the UWB ranging timeline 816 into IEs to be sent out by the RDEV in the RCM, mainly into the ARC IE and the RDM IE. At operation 1011, the coordinator 802 passes these IEs to the RDEV and requests that they be used, thereby instructing the RDEV to use the UWB ranging timeline 816.

At operation 1013, the coordinator 802 determines if there are any changes to the SPs of the sleep-wake schedule 812. If there are changes, then the process 1000 returns to operation 1001, so that the STA can identify the changed SPs of the sleep-wake schedule 812. Otherwise, if there are no changes, then the process 1000 continues to operation 1015.

At operation 1015, the coordinator 802 determines if the ranging event is complete. If the ranging event is not complete, then the coordinator 802 moves to the next ranging round and repeats the sequence of action until the ranging event completes.

Although FIG. 10 illustrates one example of a process 1000 for shaping a UWB ranging timeline for coexistence with Wi-Fi communication, various changes may be made to FIG. 10. For example, while shown as a series of steps, various steps in FIG. 10 could overlap, occur in parallel, occur in a different order, or occur any number of times.

Coexistence Via S-APSD and Legacy Power Management

In some embodiments, the STA can use S-APSD (rather than TWT) to define and follow a sleep-wake schedule 812. In these embodiments, the STA suggests a schedule to the AP by defining a set of parameters in a request frame, including the Minimum/Maximum Service Interval and Service Start Time. Legacy power management uses the mechanisms defined in the original IEEE 802.11 standard. With Legacy power management, the STA can create an artificial SP as follows. The STA can keep track of an internal clock that wakes it up and puts it back to sleep. The internal clock specifies the size and location of the SPs. There are two mechanisms to go to and wake up from sleep:

(1) The STA goes to sleep by transitioning from Active mode to PS mode where the STA remains in the Doze state. The STA wakes up from sleep by transitioning from PS back to Active.

(2) The STA goes to sleep by transitioning from the Awake state to the Doze state while in PS mode. The STA wakes up from sleep by transitioning from the Doze state to the Awake state. Unlike in Active mode, the STA retrieves data by polling the AP for buffered frames one at a time.

Figure 17:
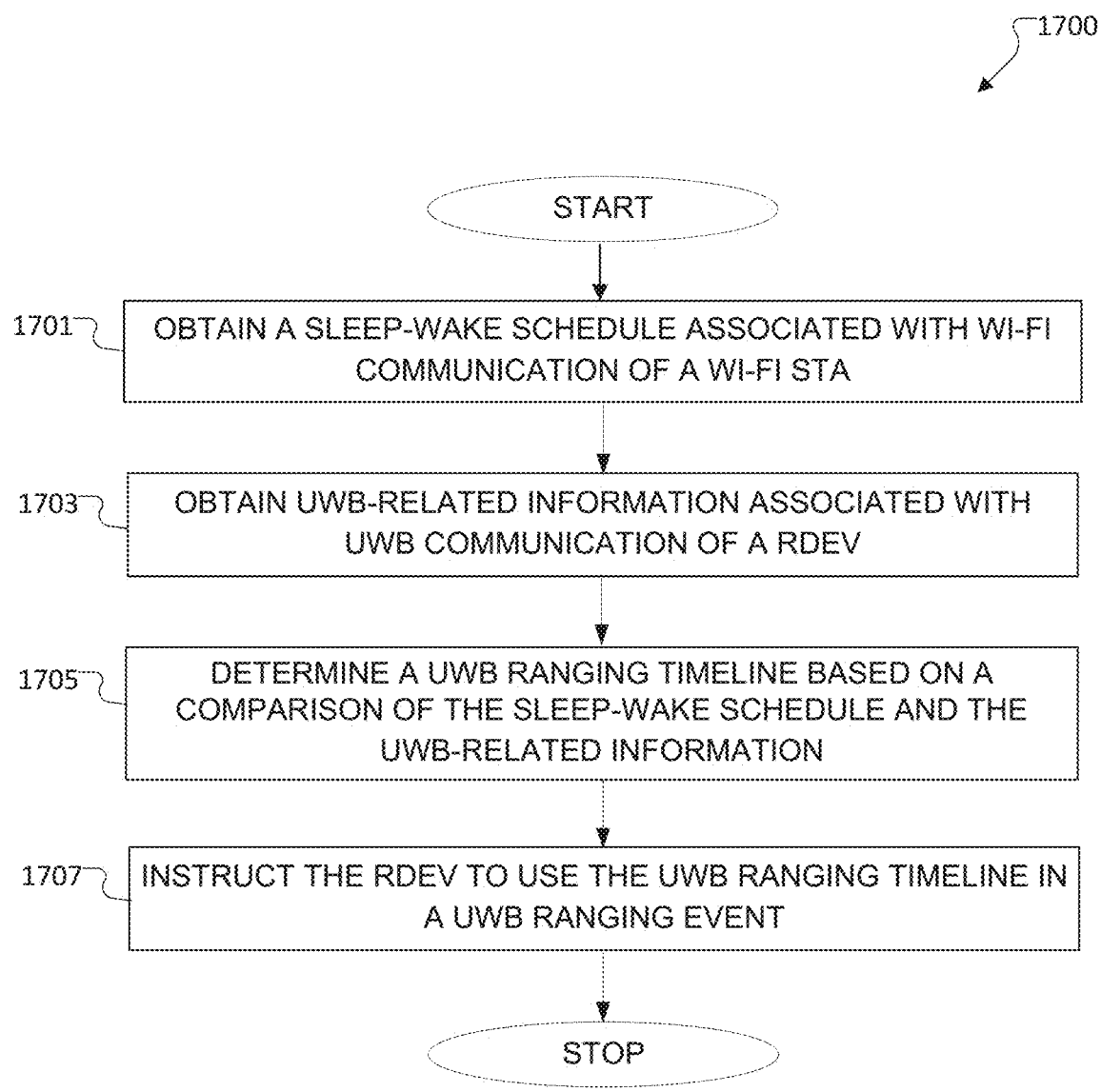
FIG. 17 illustrates a flow chart of a method for shaping a UWB ranging timeline for coexistence with Wi-Fi communication according to embodiments of the present disclosure.

FIG. 17 illustrates a flow chart of a method 1700 for shaping a UWB ranging timeline for coexistence with Wi-Fi communication according to embodiments of the present disclosure, as may be performed by a STA executing a coordinator (e.g., the coordinator 802 as illustrated in FIG. 8). The embodiment of the method 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions.

As illustrated in FIG. 17, the method 1700 begins at step 1701. At step 1701, the coordinator obtains a sleep-wake schedule associated with Wi-Fi communication of a STA. This could include, for example, the STA 111 executing the coordinator 802 to obtain the sleep-wake schedule 812, such as described in operation 903 and operation 1003. The sleep-wake schedule 812 can include a sleep duration between consecutive wake times in the Wi-Fi communication. In some embodiments, the sleep-wake schedule 812 can be defined by a Target Wake Time 403, a TWT Interval 404, and a Minimum TWT Wake Duration 405. In some embodiments, the sleep-wake schedule 812 can be defined by a S-APSD Service Start Time 303, a Service Interval 304, and a Maximum SP Length 305.

At step 1703, the coordinator obtains UWB-related information associated with UWB communication of a RDEV. This could include, for example, the STA 111 executing the coordinator 802 to obtain the UWB-related information 814, such as described in operation 905 and operation 1007. The UWB-related information 814 can include one or more time slots comprising the UWB ranging event, a list of participants involved in the UWB ranging event and their respective roles, a ranging and localization method used, one or more requested measurements, or a combination of these.

At step 1705, the coordinator determines a UWB ranging timeline based on a comparison of the sleep-wake schedule and the UWB-related information. This could include, for example, the STA 111 executing the coordinator 802 to determine the UWB ranging timeline 816, such as described in operation 907 and 1009. In some embodiments, the UWB ranging timeline 816 can be determined based on whether the sleep duration is longer or shorter than the duration of the UWB ranging event. In some embodiments, the UWB ranging timeline 816 can be determined based on whether the sleep-wake schedule is periodic or aperiodic.

At step 1707, the coordinator instructs the RDEV to use the UWB ranging timeline in a UWB ranging event. This could include, for example, the STA 111 executing the coordinator 802 to control the STA 111 to use the UWB ranging timeline 816 in a UWB ranging event, such as described in operation 909 and 1011.

Although FIG. 17 illustrates one example of a method 1700 for shaping a UWB ranging timeline for coexistence with Wi-Fi communication, various changes may be made to FIG. 17. For example, while shown as a series of steps, various steps in FIG. 17 could overlap, occur in parallel, occur in a different order, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
    obtaining a sleep-wake schedule associated with Wi-Fi communication of a Wi-Fi station (STA);
    obtaining UWB-related information associated with ultra-wide band (UWB) communication of a ranging capable device (RDEV);
    determining a UWB ranging timeline based on a comparison of the sleep-wake schedule and the UWB-related information; and
    instructing the RDEV to use the UWB ranging timeline in a UWB ranging event.

2. The method of claim 1, wherein:
    the sleep-wake schedule comprises a sleep duration between consecutive wake times in the Wi-Fi communication; and
    the UWB-related information comprises one or more time slots comprising the UWB ranging event.

3. The method of claim 2, wherein determining the UWB ranging timeline comprises:
    when the sleep duration is longer than the duration of the UWB ranging event, scheduling an entirety of the UWB ranging event within the sleep duration; and
    when the sleep duration is shorter than the duration of the UWB ranging event, scheduling a first portion of active ranging slots of the UWB ranging event within the sleep duration, and scheduling a second portion of the active ranging slots of the UWB ranging event in a next sleep duration.

4. The method of claim 2, wherein determining the UWB ranging timeline comprises:
    when the sleep-wake schedule is periodic, configuring the UWB ranging timeline once at a start of the UWB ranging event and using the UWB ranging timeline for all ranging rounds in the UWB ranging event; and
    when the sleep-wake schedule is aperiodic, varying the UWB ranging timeline for a portion of the ranging rounds in the UWB ranging event.

5. The method of claim 1, wherein the sleep-wake schedule is defined by a Target Wake Time, a Target Wake Time (TWT) Interval, and a Minimum TWT Wake Duration.

6. The method of claim 1, wherein the sleep-wake schedule is defined according to a Service Start Time, a Service Interval, and a Maximum Service Period (SP) Length of a Scheduled Automatic Power Save Delivery (S-APSD) mechanism.

7. The method of claim 1, wherein the UWB-related information comprises at least one of: a list of participants involved in the UWB ranging event and their respective roles, a ranging and localization method used, and one or more requested measurements.

8. A device comprising:
a memory configured to store instructions; and
a processor operably connected to the memory, the processor configured, when executing the instructions, to:
obtain a sleep-wake schedule associated with Wi-Fi communication of a Wi-Fi station (STA);
obtain UWB-related information associated with ultra-wide band (UWB) communication of a ranging capable device (RDEV);
determine a UWB ranging timeline based on a comparison of the sleep-wake schedule and the UWB-related information; and
instruct the RDEV to use the UWB ranging timeline in a UWB ranging event.

9. The device of claim 8, wherein:
the sleep-wake schedule comprises a sleep duration between consecutive wake times in the Wi-Fi communication; and
the UWB-related information comprises one or more time slots comprising the UWB ranging event.

10. The device of claim 9, wherein to determine the UWB ranging timeline, the processor is configured to:
when the sleep duration is longer than the duration of the UWB ranging event, schedule an entirety of the UWB ranging event within the sleep duration; and
when the sleep duration is shorter than the duration of the UWB ranging event, schedule a first portion of active ranging slots of the UWB ranging event within the sleep duration, and schedule a second portion of the active ranging slots of the UWB ranging event in a next sleep duration.

11. The device of claim 9, wherein to determine the UWB ranging timeline, the processor is configured to:
when the sleep-wake schedule is periodic, configure the UWB ranging timeline once at a start of the UWB ranging event and use the UWB ranging timeline for all ranging rounds in the UWB ranging event; and
when the sleep-wake schedule is aperiodic, vary the UWB ranging timeline for a portion of the ranging rounds in the UWB ranging event.

12. The device of claim 8, wherein the sleep-wake schedule is defined by a Target Wake Time, a Target Wake Time (TWT) Interval, and a Minimum TWT Wake Duration.

13. The device of claim 8, wherein the sleep-wake schedule is defined according to a Service Start Time, a Service Interval, and a Maximum Service Period (SP) Length of a Scheduled Automatic Power Save Delivery (S-APSD) mechanism.

14. The device of claim 8, wherein the UWB-related information comprises at least one of: a list of participants involved in the UWB ranging event and their respective roles, a ranging and localization method used, and one or more requested measurements.

15. A non-transitory computer readable medium comprising a plurality of instructions that, when executed by at least one processor, is configured to cause the at least one processor to:
obtain a sleep-wake schedule associated with Wi-Fi communication of a Wi-Fi station (STA);
obtain UWB-related information associated with ultra-wide band (UWB) communication of a ranging capable device (RDEV);
determine a UWB ranging timeline based on a comparison of the sleep-wake schedule and the UWB-related information; and
instruct the RDEV to use the UWB ranging timeline in a UWB ranging event.

16. The non-transitory computer readable medium of claim 15, wherein:
the sleep-wake schedule comprises a sleep duration between consecutive wake times in the Wi-Fi communication; and
the UWB-related information comprises one or more time slots comprising the UWB ranging event.

17. The non-transitory computer readable medium of claim 16, wherein to determine the UWB ranging timeline, the plurality of instructions is configured to cause the at least one processor to:
when the sleep duration is longer than the duration of the UWB ranging event, schedule an entirety of the UWB ranging event within the sleep duration; and
when the sleep duration is shorter than the duration of the UWB ranging event, schedule a first portion of active ranging slots of the UWB ranging event within the sleep duration, and schedule a second portion of the active ranging slots of the UWB ranging event in a next sleep duration.

18. The non-transitory computer readable medium of claim 16, wherein to determine the UWB ranging timeline, the plurality of instructions is configured to cause the at least one processor to:
when the sleep-wake schedule is periodic, configure the UWB ranging timeline once at a start of the UWB ranging event and use the UWB ranging timeline for all ranging rounds in the UWB ranging event; and
when the sleep-wake schedule is aperiodic, vary the UWB ranging timeline for a portion of the ranging rounds in the UWB ranging event.

19. The non-transitory computer readable medium of claim 15, wherein the sleep-wake schedule is defined by a Target Wake Time, a Target Wake Time (TWT) Interval, and a Minimum TWT Wake Duration.

20. The non-transitory computer readable medium of claim 15, wherein the sleep-wake schedule is defined according to a Service Start Time, a Service Interval, and a Maximum Service Period (SP) Length of a Scheduled Automatic Power Save Delivery (S-APSD) mechanism.

* * * * *